(12) United States Patent
Chien

(10) Patent No.: US 7,147,014 B2
(45) Date of Patent: Dec. 12, 2006

(54) SMART TREE STAND WITH WATER FILLING DEVICE

(76) Inventor: Chao Chuan Chien, 8F, No.387, Chung Cheng Road, Hsin Chuang City, Taipei Hsien (TW)

( * ) Notice: Subject to any disclaimer, the term of this patent is extended or adjusted under 35 U.S.C. 154(b) by 124 days.

(21) Appl. No.: 11/050,873

(22) Filed: Feb. 7, 2005

(65) Prior Publication Data

US 2006/0174967 A1   Aug. 10, 2006

(51) Int. Cl.
*B65B 1/04* (2006.01)

(52) U.S. Cl. .......................... 141/95; 141/94; 141/199; 47/40.5; 116/110; 222/51; 222/64; 222/39

(58) Field of Classification Search ............... 141/192, 141/198, 95, 94, 98, 199, 331; 47/40.5, 40.1; 116/109, 110; 222/51, 64, 23, 39
See application file for complete search history.

(56) References Cited

U.S. PATENT DOCUMENTS 1,316,167 A * 9/1919 Lecrone ..................... 141/95
3,942,526 A * 3/1976 Wilder et al. ............... 604/253
4,014,010 A * 3/1977 Jinotti ......................... 222/51
5,661,926 A * 9/1997 Granger ..................... 47/40.5

* cited by examiner

Primary Examiner—Steven O. Douglas
(74) Attorney, Agent, or Firm—Troxell Law Office, PLLC

(57) ABSTRACT

A smart water filling device comprising: a vessel, having an outlet and a space extended outwardly from one side of the vessel; a tube, one side coupled to the outlet; a float device, having a housing and a float, wherein the float is disposed inside the housing and the housing has at least one opening and one side of the housing is connected to the other side of the tube; a control device, having a housing and a control circuit, wherein the housing is positioned beside the housing of the float device and the control circuit is disposed therein; and a warning device, disposed inside the space and coupled to the control circuit; whereby while the water being filled into the vessel, the control circuit can detect the position of the float and determine the water level inside the float device, and alarm to the user by way of using the warning device.

19 Claims, 4 Drawing Sheets

SMART TREE STAND WITH WATER FILLING DEVICE

BACKGROUND OF THE INVENTION

1. Field of the Invention

The present invention relates to a water filling device, and particularly the present invention relates to a smart tree stand with water alarm and water filling device which comprises a vessel, tube, float device, control device and warning device; whereby while the water being filled into the vessel, the control circuit can detect the position of the float and determine the water level inside the float device, and alarm to the user by way of using the warning device.

2. Description of Related Art

Generally speaking, the Christmas tree used interior often comprises a tree stand for accommodating the trunk of the Christmas tree and the required water. However, the prior art tree stand while using, the user needs to crawl on the floor to check the water level of the tree stand, and the prior art tree stand does not have the warning device to notice the user to stop filling the water when the water approaches to the higher water level such that the water will ruin the carpets or floor frequently.

There is therefore a need for a new and improved strategy and technique for overcoming these deficiencies and the present invention overcomes these deficiencies in a new and novel fashion.

SUMMARY OF THE INVENTION

The present invention generally relates to a strategy and a technique which overcomes some or all of the above referenced deficiencies associated with prior art tree stand.

It is a first non-limited object of the present invention is to provide a smart water filling device which comprises a vessel, tube, float device, control device and warning device; whereby while the water being filled into the vessel, the control circuit can detect the position of the float and determine the water level inside the float device, and alarm to the user by way of using the warning device.

It is a second non-limited object of the present invention is to provide a tree stand for using in a filling water system, comprises a space and a plurality of extended petals; wherein the space can accommodate the water flowed from the opening of the float device and the housing of the control device can be fastened on the walls of the space; and the top portion of some petals further comprises a protrusion portion and a screw hole passes through it such that a plurality of fixing pins with thread can be passed through the screw holes and fasten a plant inside the tree stand.

According to a first non-limited object of the present invention, a smart water filling device is provided and comprises a vessel, having an outlet and a space extended outwardly from one side of the vessel; a tube, one side coupled to the outlet; a float device, having a housing and a float, wherein the float is disposed inside the housing and the housing has at least one opening and one side of the housing is connected to the other side of the tube; a control device, having a housing and a control circuit, wherein the housing is positioned beside the housing of the float device and the control circuit is disposed therein; and a warning device, disposed inside the space and coupled to the control circuit; whereby while the water being filled into the vessel, the control circuit can detect the position of the float and determine the water level inside the float device, and alarm to the user by way of using the warning device.

According to a second non-limited object of the present invention, a tree stand is provided and comprises a space and a plurality of extended petals; wherein the space can accommodate the water flowed from the opening of the float device and the housing of the control device can be fastened on the walls of the space; and the top portion of some petals further comprises a protrusion portion and a screw hole passes through it such that a plurality of fixing pins with thread can be passed through the screw holes and fasten a plant inside the tree stand.

BRIEF DESCRIPTION OF THE DRAWINGS

The present invention can be more fully understood by referring to the following description and accompanying drawings, in which.

DETAILED DESCRIPTION OF THE PREFERRED EMBODIMENTS

Figure 1:
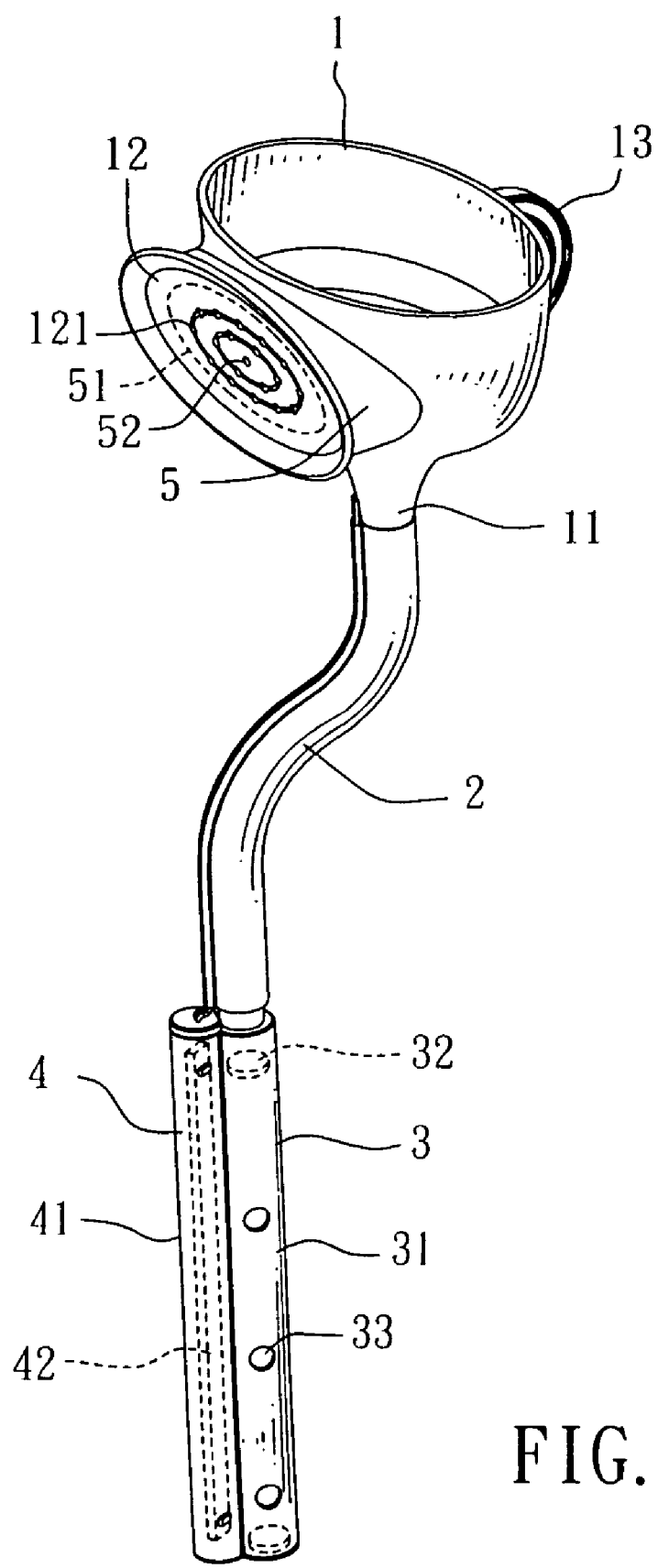
FIG. 1 is the prospective view which shows a smart water filling device according to one preferred embodiment of the present invention.

Please refer to FIG. 1, which shows a smart water filling device according to one preferred embodiment of the present invention. As shown in FIG. 1, the smart water filling device of the present invention comprises: a vessel 1; a tube 2; a float device 3; a control device 4; and a warning device 5:

Wherein, the vessel 1 is for example but not limited to a funnel shape, having an outlet 11 and a space 12 extended outwardly from one side of the vessel 1; furthermore, the vessel 1 of the present invention further comprises a handle 13 and the space 12 further has a plurality of ring-shaped trenches 121.

The tube 2 is for example but not limited to a soft pipe, wherein one side of the tube 2 is coupled to the outlet 11 for transporting water from the vessel 1 to the float device 3.

The float device 3 has a housing 31 and a float 32, wherein the float 32 is disposed inside the housing 31 and the housing 31 has at least one opening 33 and one side of the housing 31 is connected to the other side of the tube 2. The float 32 of the present invention is for example but not limited to a magnet and its position in the housing 31 can be varied according to the water level of the housing 31. Furthermore, both sides of the housing 31 of the float device 3 are open, and it further comprises a lower cover 34 for plugging into the lower side of the housing 31 so as to prevent the water leaking form the housing 31.

The control device 4 has a housing 41 and a control circuit 42, wherein the housing 41 is positioned beside the housing 31 of the float device 3 and the control circuit 42 is disposed inside the housing 41

The warning device 5 is disposed inside the space 12 and coupled to the control circuit 42. Furthermore, the warning device 5 further comprises a speaker 51 and an indicator 52, wherein the speaker 51 and indicator 52 is disposed inside the space 12, respectively, and the indicator 52 is for example but not limited to a LED and protruded from the ring-shaped trenches 121 so as easy to observe. The vessel 1, tube 2, housing 31 and housing 41 are made of insulating materials, for example but not limited to plastic.

Figure 2:
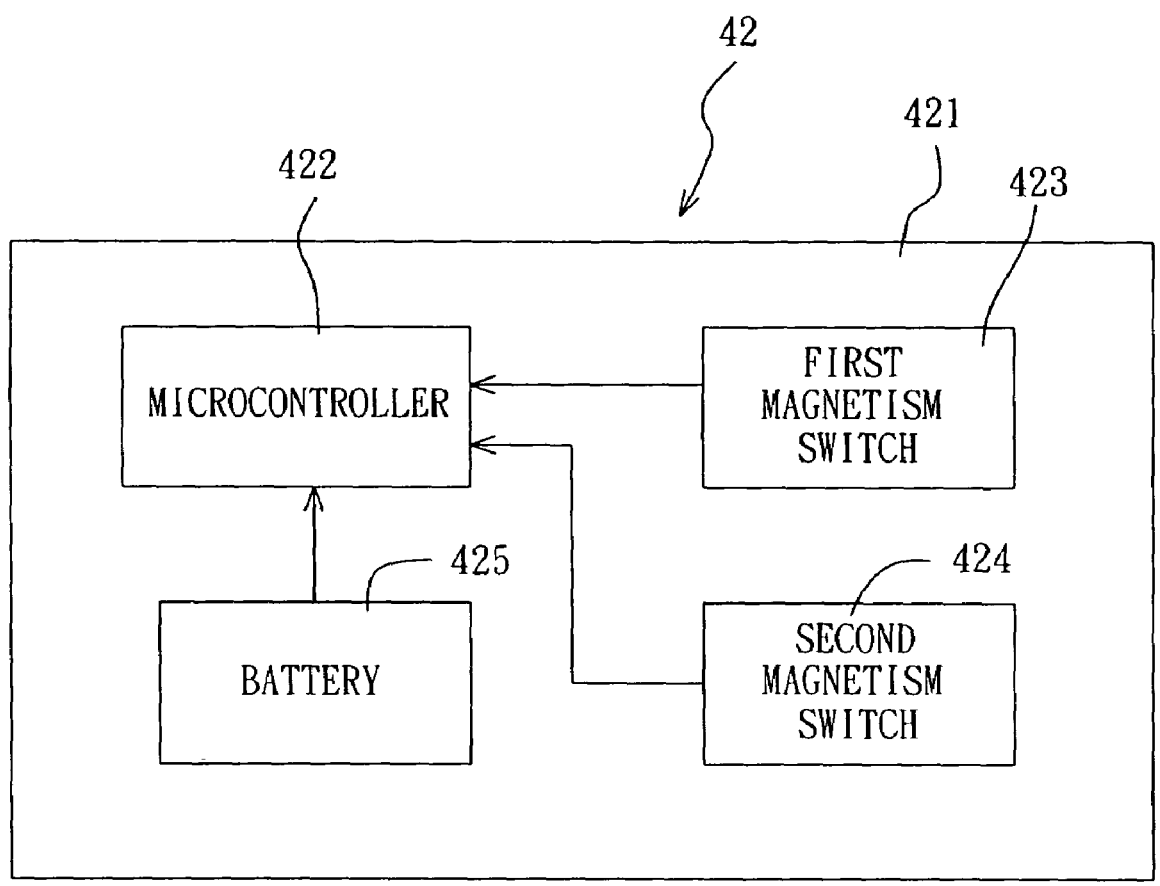
FIG. 2 is the block diagram of the control circuit 42 according to one preferred embodiment of the present invention.

Please refer to FIG. 2, which shows the block diagram of the control circuit 42 according to one preferred embodiment of the present invention. As shown in FIG. 2, the smart water filling device of the present invention further comprises: a printed circuit board 421; a microcontroller 422; a first magnetism switch 423; a second magnetism switch 424; and a battery 425.

Wherein, the printed circuit board (referred as PCB) 421 is disposed inside the housing 41 for conveying the microcontroller 422, first magnetism switch 423, second magnetism switch 424, and battery 425. The microcontroller 422 is disposed on the PCB 421 and coupled to the speaker 51 and indicator 52 of the warning device 5. The first magnetism switch 423 is disposed on one side of the PCB 421, for example but not limited to lower side, and coupled to the microcontroller 422. The second magnetism switch 423 is disposed on the other side of the PCB 421, for example but not limited to upper side, and coupled to the microcontroller 422. The battery 425 is coupled to the microcontroller 422 for providing power to the microcontroller 422. Wherein, the first magnetism switch 423 is used to detect for example but not limited to the lower water level, while the second magnetism switch 424 is used to detect for example but not limited to the higher water level.

Figure 3:
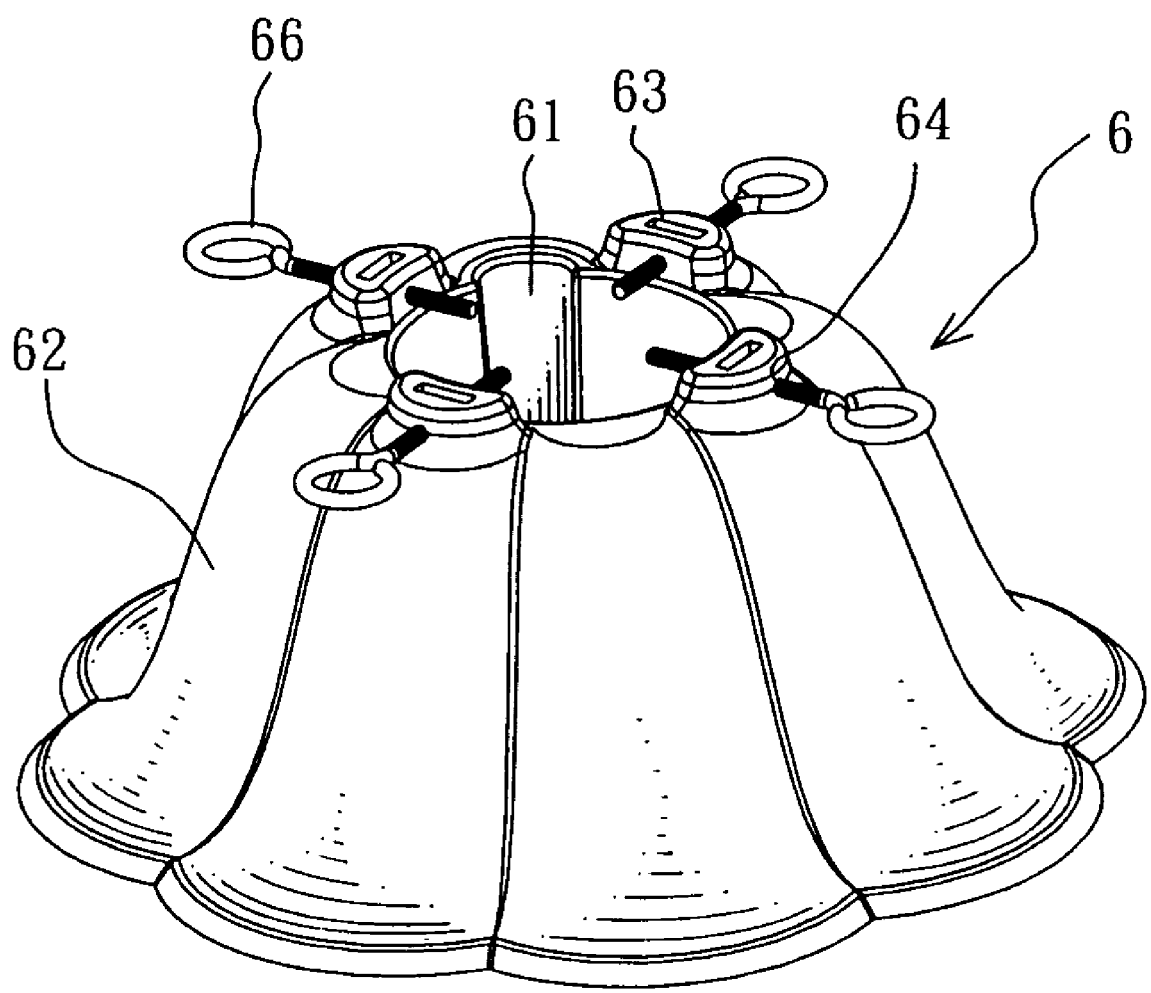
FIG. 3 is the prospective view which shows a tree stand according to one preferred embodiment of the present invention.

Please refer to FIG. 3, which shows a tree stand according to one preferred embodiment of the present invention. As shown in FIG. 3, the tree stand 6 of the present invention is used in an aforesaid filling water system. The tree stand 6 of the present invention comprises a space 61 and a plurality of extended petals 62; wherein the space 61 can accommodate the water flowed from the opening 33 of the float device 3 and the top portion of some petals 62 further comprises a protrusion portion 63 and a screw hole 64 passes through it such that a plurality of fixing pins 66 with thread can be passed through the screw holes 64 and fasten a plant inside the tree stand 6. Wherein the protrusion portions 63 of the tree stand 6 are disposed discontinuity, preferably.

Figure 4:
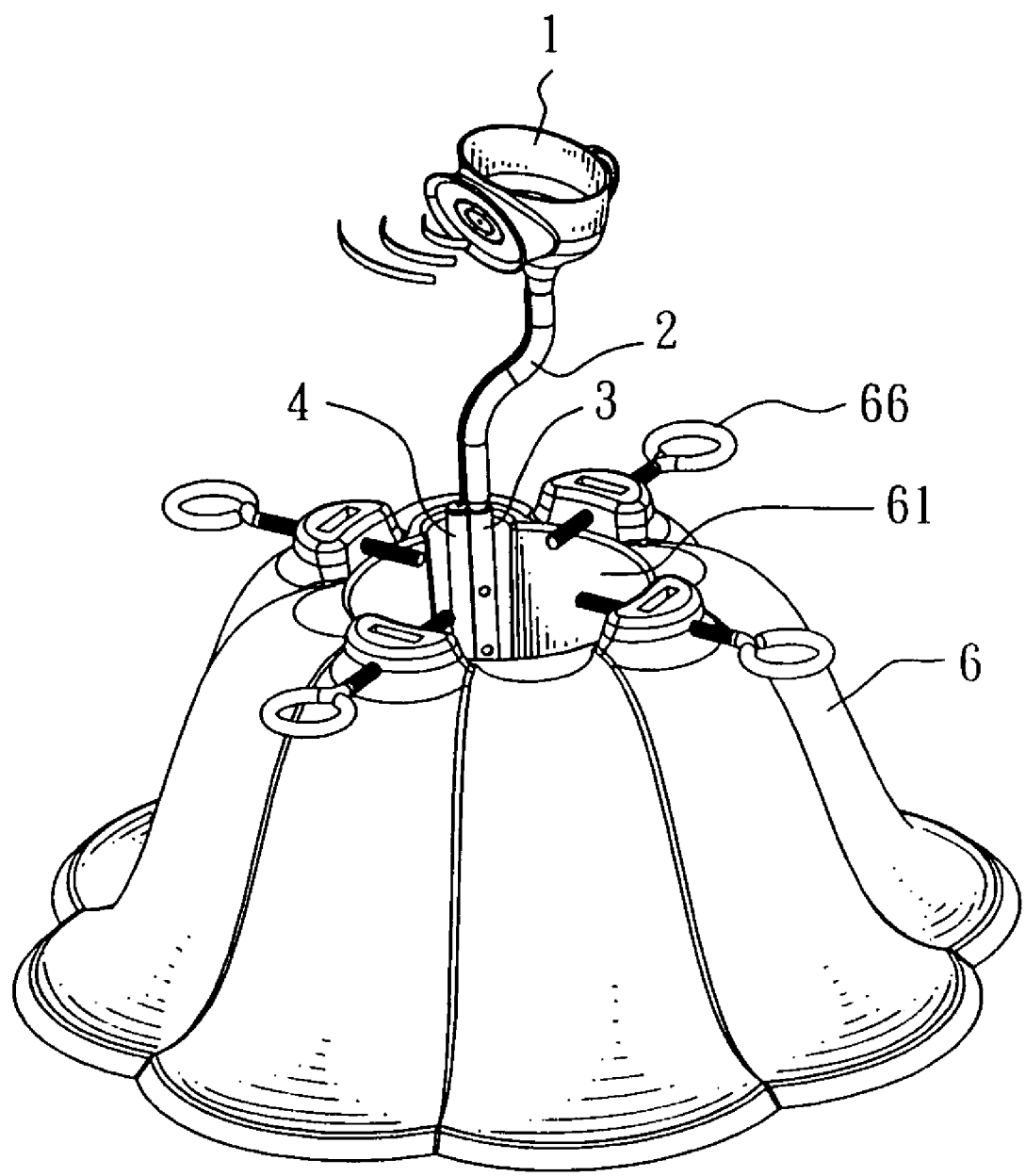
FIG. 4 is the prospective view which shows that the smart water filling device is assembled with the tree stand according to one preferred embodiment of the present invention.

Please refer to FIG. 4, which shows that the smart water filling device is assembled with the tree stand according to one preferred embodiment of the present invention. As shown in FIG. 4, the smart water filling device of the present invention while using, can fasten the float device 3 and control device 4 on the walls of the space 61; and dispose the truck of the plant (figure not shown) for example but not limited to a Christmas tree inside the space 61; then use a plurality of fixing pins 66 passing and screwing through the screw holes 64 until the fixing pins 66 approaching and clipping the truck of the Christmas tree, such that the float device 3, control device 4 and the truck of the Christmas tree are together fastened inside the space 61.

While the water level of the housing 31 approaching to the lower water level, due to the float 32 is floated above the water, therefore the float 32 will approach to the first magnetism switch 423 and the first magnetism switch 423 will be conducted by way of the magnetic force of the float 32 and causes the microcontroller 422 generating a first control signal to the warning device 5; while the float 32 approaching to the higher water level, due to the float 32 is floated above the water, therefore the float 32 will approach to the second magnetism switch 424 and the second magnetism switch 424 will be conducted by way of the magnetic force of the float 32 and causes the microcontroller 422 generating a second control signal to the warning device 5.

Wherein, the first control signal represents the float 32 approaching to a lower water level, and the microcontroller 422 will generate a short-interval, for example but not limited to 30 seconds interval warning signal through the speaker 51, or generate red light warning signal through the LED 52 for reminding the user to fill water. Wherein, the second control signal represents the float 32 approaching to a higher water level, and the microcontroller 422 will generate long-interval, for example but not limited to 60 seconds warning signal through the speaker 51 for reminding the user that the water level is approaching to the higher water level. While the water level of the housing 31 is between the lower water level and the higher water level, namely, the water level of the housing 31 is in a normal state, the microcontroller 422 will drive the LED 52 to emit green light.

According to the smart filling device of the present invention, the user can obtain the position of the float 32 by observing the color of the LED 52 or listening to the sound generated by the speaker 51 to determine whether fills water or not, such that the aforesaid drawbacks of the prior art water filling system can be overcame.

While the invention has been described with reference to preferred embodiment thereof, it is to be understood that modifications or variations may be easily made without departing from the spirit of this invention, which is defined by the appended claims.

What is claimed is:

1. A smart water filling device comprising:
   a vessel, having an outlet and a space extended outwardly from one side of said vessel;
   a tube, one side coupled to said outlet;
   a float device, having a housing and a float, wherein said float is disposed inside said housing and said housing has at least one opening and one side of said housing is connected to the other side of said tube;
   a control device, having a housing and a control circuit, wherein said housing is positioned beside said housing of said float device and said control circuit is disposed therein; and;
   a warning device, disposed inside said space and coupled to said control circuit;
   whereby while the water being filled into said vessel, said control circuit can detect the position of said float and determine the water level inside said float device, and alarm to the user by way of using said warning device.

2. The smart water filling device as claimed in claim 1, wherein said vessel is a funnel and it further comprises a handle, and said space further has a plurality of ring-shaped trenches.

3. The smart water filling device as claimed in claim 1, wherein said tube is a soft pipe.

4. The smart water filling device as claimed in claim 1, wherein said float is a magnet.

5. The smart water filling device as claimed in claim 1, wherein said warning device further comprises a speaker and an indicator.

6. The smart water filling device as claimed in claim 5, wherein said indicator is a LED.

7. The smart water filling device as claimed in claim 5, wherein said control circuit further comprises:
   a printed circuit board, disposed inside said housing;
   a microcontroller, disposed on said PCB and coupled to said warning device;
   a first magnetism switch, disposed on one side of said PCB and coupled to said microcontroller;

a second magnetism switch, disposed on the other side of said PCB and coupled to said microcontroller;

a battery, coupled to said microcontroller, for providing power to said microcontroller;

Whereby, while said float approaching to said first magnetism switch, said first magnetism switch will be conducted by way of the magnetic force of said float and cause said microcontroller generating a first control signal to said warning device; while said float approaching to said second magnetism switch, said second magnetism switch will be conducted by way of the magnetic force of said float and cause said microcontroller generating a second control signal to said warning device.

8. The smart water filling device as claimed in claim 7, wherein said first control signal represents said float approaching to a lower water level, and said microcontroller will generate short-interval warning signal through said speaker, or generate red light warning signal through said LED for reminding the user to fill water.

9. The smart water filling device as claimed in claim 7, wherein said second control signal represents said float approaching to a higher water level, and said microcontroller will generate long-interval warning signal through said speaker for reminding the user that the water level approaches to the higher water level.

10. The smart water filling device as claimed in claim 7, wherein said float positioned between said first magnetism switch and said second magnetism switch, said microcontroller will drive said LED to emit green light.

11. The smart water filling device as claimed in claim 1, wherein both sides of said housing of said float device are open, and it further comprises a lower cover for plugging into said lower side of said housing so as to prevent the water leaking form said housing.

12. The smart water filling device as claimed in claim 1, wherein it further comprises a tree stand, which has a space and a plurality of extended petals; wherein said space can accommodate the water flowed from said opening of said float device and said housing of said control device can be fastened on the walls of said space; and the top portion of some petals further comprises a protrusion portion and a screw hole passes through it such that a plurality of fixing pins with thread can be passed through said screw holes and fasten a plant inside said tree stand.

13. The smart water filling device as claimed in claim 12, wherein said tree stand is made of insulating materials.

14. The smart water filling device as claimed in claim 13, wherein one of said insulating materials is plastic.

15. The smart water filling device as claimed in claim 12, wherein said protrusion portions of said tree stand are disposed discontinuity.

16. A tree stand for using in a filling water system, comprises a space and a plurality of extended petals; wherein said space can accommodate the water flowed from said opening of said float device and said housing of said control device can be fastened on the walls of said space; and the top portion of some petals further comprises a protrusion portion and a screw hole passes through it such that a plurality of fixing pins with thread can be passed through said screw holes and fasten a plant inside said tree stand.

17. The tree stand as claimed in claim 16, wherein said tree stand is made of insulating materials.

18. The tree stand as claimed in claim 17, wherein one of said insulating materials is plastic.

19. The tree stand as claimed in claim 16, wherein said protrusion portions of said tree stand are disposed discontinuity.

* * * * *